Oct. 28, 1952 G. J. HENRICH 2,615,923
MANUFACTURE OF SODIUM CHLOROPHENATE
Filed May 2, 1950
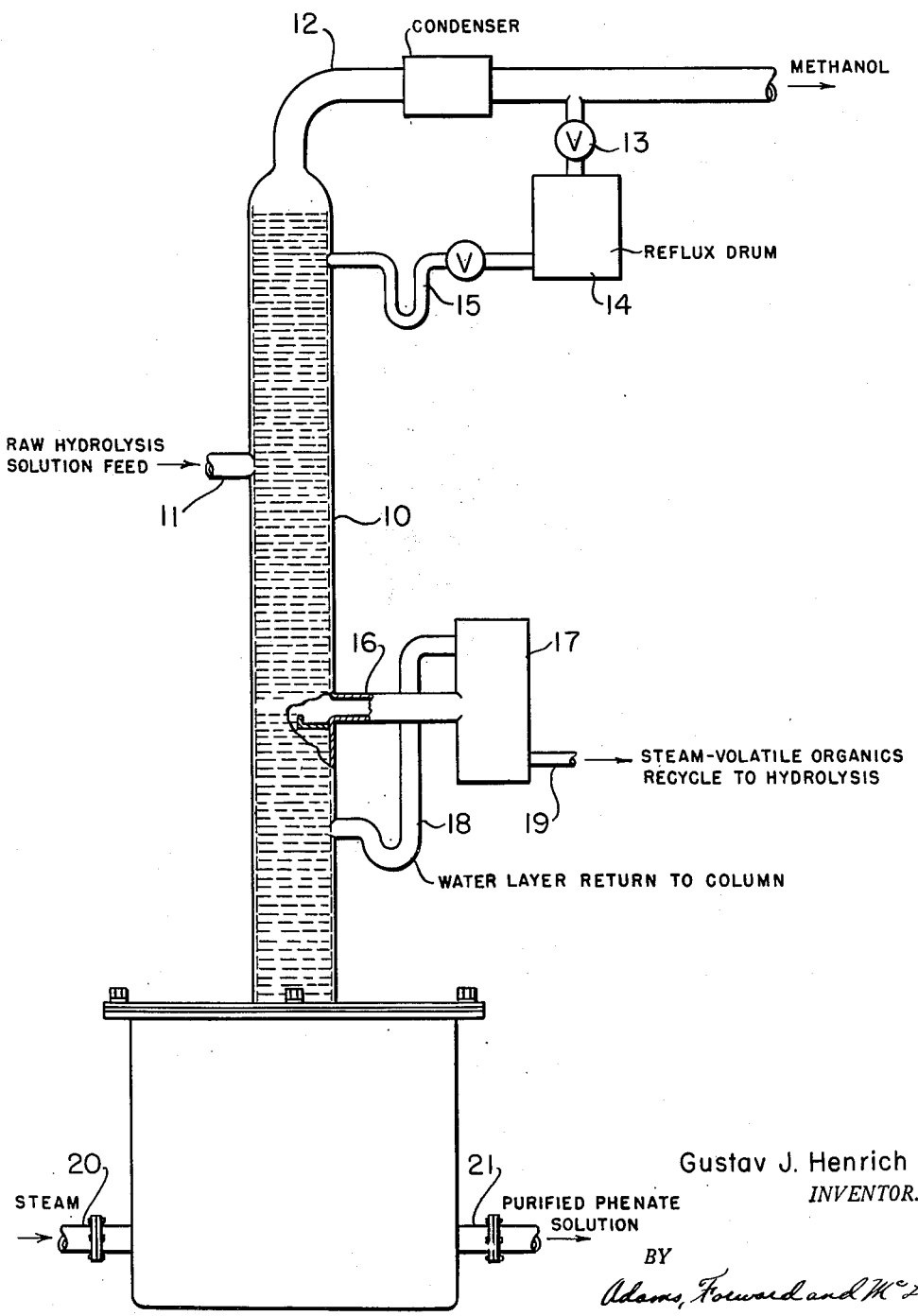
Gustav J. Henrich
INVENTOR.
BY
Adams, Forward and McLean
ATTORNEYS Patented Oct. 28, 1952

2,615,923

UNITED STATES PATENT OFFICE 2,615,923

MANUFACTURE OF SODIUM CHLOROPHENATE

Gustav J. Henrich, Niagara Falls, N. Y., assignor to Mathieson Chemical Corporation, a corporation of Virginia Application May 2, 1950, Serial No. 159,640

2 Claims. (Cl. 260—623)

My invention relates to the production of a chlorophenoxyaliphatic acid, particularly 2,4,5-trichlorophenoxyacetic acid, with particular reference to the process of manufacture characterized by intermediate condensation of an appropriate chlorophenate with an alkali metal salt of the desired chloroaliphatic acid in alkaline solution. In one aspect, my invention provides means for effecting substantial economies in the overall process by employing a particular chlorophenate mixture in the condensation reaction. In a special aspect, it contemplates a particular method of preparing the chlorophenate mixture for use in the condensation reaction.

The conventional manufacture of chlorophenoxyaliphatic acids involves the condensation of an alkali metal chlorophenate with the alkali metal salt of a haloaliphatic acid in aqueous medium. Thus, 2,4,5-trichlorophenoxyacetic acid is conventionally manufactured by reaction of sodium 2,4,5-trichlorophenate and sodium chloroacetate followed by subsequent separation and acidification of the resulting sodium 2,4,5-trichlorophenoxyacetate. The reaction requires a chlorophenate of relatively high purity for good yields, which means that the corresponding chlorophenol must be available in good purity. Conventionally, the chlorophenols are derived from phenol by chlorination. They may be produced, however, by selective hydrolysis of chlorobenzenes. The introduction of the hydroxy group into the benzene ring or alternatively the isolation of the crude phenol involves in each instance the use of at least stoichiometric proportions of caustic soda. This amount of caustic is not available for the chlorophenoxyacetic acid manufacturing process because conventional recovery of the hydroxylation product involves acidification and purification of the free phenol. The purified phenol is then redissolved in caustic for use in the chlorophenoxyacetic acid condensation reaction.

I have devised a system in which a phenate mixture is obtained by hydrolysis of 1,2,4,5-tetrachlorobenzene and is prepared for direct use in the condensation reaction without loss of the caustic employed in the hydrolysis step. According to my invention 1,2,4,5-tetrachlorobenzene is hydrolyzed with excess caustic soda in an alcohol and water medium. The hydrolysis reaction mixture is then fractionated by distillation in the presence of steam to separate the alcohol as an overhead product and a steam-volatile organic mixture as an intermediate product. The residual phenate mixture is recovered as bottoms, substantially free of alcohol, unreacted chlorobenzenes and other organic contaminants in form for charging to the condensation reaction.

The alcohol employed in the hydrolysis step is a volatile lower aliphatic alcohol such as methanol, ethanol or isopropyl alcohol. Methanol, however, is particularly useful. In the fractionation step, the crude hydrolysis mixture is advantageously introduced to a distillation column into which steam is introduced in the lower portion. Methanol is removed overhead and a liquid side stream is removed containing unreacted chlorobenzene, by-product anisoles and other organic materials volatile with steam. The side stream product is separated into organic and aqueous fractions and the aqueous fraction is returned to the distillation zone at a point below the side stream or intermediate draw-off. The residual solution contains the sodium 2,4,5-trichlorophenate, excess caustic and sodium chloride formed in the hydrolysis reaction. The presence of the sodium chloride represents an important advantage in the condensation reaction since it aids in salting out the condensation product and in improving the yield.

The phenate purification step may be conducted in a single distillation column equipped for side stream draw-off or it may be conducted in a multiple column system. It may be conducted batchwise, but advantageously the phenate solution is treated continuously. The principles of the separation will be further illustrated with reference to the accompanying drawing which depicts the distillation apparatus diagrammatically.

In the drawing, the crude hydrolysis mixture is charged to the upper portion of packed or otherwise divided distillation column 10 through line 11. The alcohol solvent, e. g. methanol, is removed overhead through line 12, and reflux may be provided to the tower top through valved connection 13, reflux drum 14 and valved connection 15. A liquid side stream is removed from a lower portion of the tower through connection 16 to separator 17. The aqueous fraction is decanted through line 18 and returned to a point in distillation column 10 below side stream draw-off 16. A lower organic layer is withdrawn from separator 10 through line 19. Obviously, where the organic layer is lighter than the water fraction, the decanting arrangement is reversed.

Open steam is supplied to the bottom of distillation column 10 through connection 20 and the purified phenate mixture is removed through line 21. The bottom of the distillation column 10 may take the form of an integral distillation pot or may consist of a separate reboiler vessel suitably connected to distillation column 10. Closed steam coils or other additional heating means may be provided at the bottom of the distillation column 10 if desired.

In operation, substantially anhydrous methanol is removed overhead, and a suitable proportion to control the fractionation is returned to the top of the column as reflux. As the feed and reflux mixture passes downward through the stripping section of column 10, methanol is transferred from the liquid phase to the vapor phase, diminishing the concentration of methanol until a composition is attained in which the volatile organics (chlorobenzenes and chloroanisoles) are nearly insoluble and come out of solution to form a second liquid phase. At this point a side stream of the liquid which is substantially free of methanol is removed from the column through a cooling section if desired and is separated into two layers by gravity or other suitable means. The organic layer is segregated, and the aqueous layer is returned to the column immediately below the point of take-off for further stripping of methanol and the remaining aromatic compounds. Purified phenate solution is removed from the bottom of the column to accumulating tanks and storage or is charged directly to a reactor for the condensation reaction.

The steam-volatile organic materials largely comprise chloroanisoles and unreacted chlorobenzenes from the hydrolysis reaction and are suitably recycled to that step. The organics may be continuously recycled or may be accumulated for use as a separate batch where the hydrolysis is run batchwise. Eventually the steam-volatile organics, separated from the column when such recycled material is being hydrolyzed and recharged to the column, accumulate as material unsuitable for recycling and may be discharged to waste.

My invention will be further illustrated in the following examples which are not intended to be limiting with respect to the particular operating procedures and conditions set forth:

Example I

In the hydrolysis of 1,2,4,5-tetrachlorobenzene, 175 parts by weight of that material were charged to a reactor together with 213 parts of methanol and 81 parts of sodium hydroxide added as 73 per cent caustic. After heating under pressure for 5 hours at about 330° F. and 250 p. s. i., a portion of the contents of the autoclave was charged to a distilling column packed with glass helices. Water was charged to the pot at the same rate that methanol was removed from the top of the column. The overhead product was substantially 100 per cent methanol and was suitable for recharging to the hydrolysis step. A water-oil-alcohol mixture removed from the column was subsequently stripped by passing steam therethrough to remove small amounts of methanol and the water was separated from the oil. The alcohol was returned to the column at a point slightly above the feed point of the crude charge stock and the water solution was returned to the column below the take-off of the side stream. The phenate liquor removed from the pot was of a quality suitable for direct utilization in a condensation reaction as indicated by the characteristics of the phenol obtained on acidification of a sample of the phenate liquor.

Example II

A hydrolysis batch derived from 175 pounds of tetrachlorobenzene, 213 pounds of methanol and 81 pounds of sodium hydroxide as 73 per cent sodium hydroxide solution which had been heated under pressure for 5 hours was fractionated to remove as much as possible of the methanol which was taken overhead through a distilling column. After the methanol had been removed, the mixture of aqueous liquor and oil was steam distilled to remove the oil which comprised unreacted tetrachlorobenzene, chloroanisoles and impurities from the tetrachlorobenzene charge which are suitable for recycling. The residual liquor containing 28 per cent of sodium 2,4,5-trichlorophenate was used in a condensation reaction. Chloroacetic acid was carefully dissolved therein to approximately the stoichiometric proportion and the mixture was refluxed for 3 hours. On cooling, the sodium 2,4,5-trichlorophenoxyacetate was filtered from the mixture as the product. It amounted to 3.28 mols representing a yield of 65.6 per cent. This is substantially the same yield as was obtained in a similarly treated batch in which pure 2,4,5-trichlorophenol was used as the starting material for the condensation reaction.

Example III

A mixture of 45.5 parts by weight of 1,2,4-trichlorobenzene, 25 parts of sodium hydroxide and 115.5 parts of 90% methanol (10% water) was heated under pressure for 6 hours at 150° C. After cooling the methanol was distilled off and the residue was steam distilled, recovering a mixture of dichloroanisoles and unreacted trichlorobenzene. 2,5-dichlorophenol, isolated by acidification of a sample of the residue from steam distillation, had a chlorine content of 43.6% (theory, 43.8%) and a melting point of 57° C. (literature, 58° C.). The sodium 2,5-dichlorophenate solution was therefore of a high purity and suitable for direct conversion to sodium 2,5-dichlorophenoxyacetate and the corresponding acid.

Example IV

A mixture of 54 parts by weight of 1,2,3,4-tetrachlorobenzene, 25 parts of sodium hydroxide and 115 parts of 90% methanol was heated at 150–155° C. for 6 hours under pressure. The cooled reaction mixture was distilled to remove methanol and the residue was steam distilled. The small amount of organic material thus removed comprised principally trichloroanisoles with a trace of unreacted tetrachlorobenzene. The yield of phenols, a mixture of 2,3,4- and 2,3,6-trichlorophenol was 93.7%. Acidification of a portion of the phenate solution yielded mixed trichlorophenols of 53.5–58° C. melting point and neutral equivalent of 195.7 (calculated, 197.5) indicating a high degree of purity.

Other sodium chlorophenates; e. g. sodium 2,5-dichlorophenate, may be prepared and purified according to the general hydrolysis and fractionation procedure of my invention, but the special utility of the procedure in improving the chlorophenoxy acid process is peculiar to the process involving sodium 2,4,5-trichlorophenate.

I claim:

1. The method of producing a solution of a sodium chlorophenate which comprises hydrolyzing polychlorobenzene with excess sodium hydroxide in a volatile lower alcohol and water medium, introducing the resulting reaction mixture to a distillation zone, injecting steam into the lower end of the distillation zone, removing the alcohol overhead, removing a water and steam volatile product mixture containing anisols at an intermediate stage of the distillation zone, separating the intermediate product mixture into an organic fraction containing anisols and an aqueous fraction, returning the aqueous fraction to the distillation zone at a stage lower than the intermediate draw-off stage, and recovering the sodium chlorophenate solution as bottoms from the distillation zone.

2. The method of claim 1 in which the alcohol is methanol.

GUSTAV J. HENRICH.

REFERENCES CITED

The following references are of record in the file of this patent:

UNITED STATES PATENTS

| Number | Name | Date |
|---|---|---|
| 2,051,782 | Buchheim et al. | Aug. 18, 1936 |
| 2,068,905 | Bruson | Jan. 26, 1937 |
| 2,126,648 | Lofton et al. | Aug. 9, 1938 |
| 2,198,292 | Reiff et al. | Apr. 23, 1940 |
| 2,390,941 | Jones | Dec. 11, 1945 |

FOREIGN PATENTS

| Number | Country | Date |
|---|---|---|
| 592,827 | Great Britain | Sept. 30, 1947 |
| 617,448 | Great Britain | Feb. 7, 1949 |